(12) United States Patent
Kim

(10) Patent No.: US 7,155,965 B2
(45) Date of Patent: Jan. 2, 2007

(54) METHOD AND SYSTEM FOR DETERMINING COMBUSTION MISFIRE OF AN INTERNAL COMBUSTION ENGINE

(75) Inventor: Chang Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/158,404

(22) Filed: Jun. 21, 2005

(65) Prior Publication Data

US 2006/0000264 A1    Jan. 5, 2006

(30) Foreign Application Priority Data

Jun. 30, 2004    (KR) .................. 10-2004-0050094

(51) Int. Cl.
*G01M 15/00* (2006.01)
(52) U.S. Cl. ................................... 73/117.3
(58) Field of Classification Search ............... 73/116, 73/117.2, 117.3, 118.1
See application file for complete search history.

(56) References Cited

U.S. PATENT DOCUMENTS

| | | | | |
|---|---|---|---|---|
| 5,237,862 A | * | 8/1993 | Mangrulkar et al. | 73/116 |
| 5,415,036 A | * | 5/1995 | Park | 73/117.3 |
| 5,758,307 A | * | 5/1998 | Haefner et al. | 701/101 |
| 5,955,663 A | * | 9/1999 | Ries-Muller et al. | 73/117.3 |
| 6,112,149 A | * | 8/2000 | Varady et al. | 701/111 |
| 6,415,656 B1 | * | 7/2002 | Bidner et al. | 73/117.3 |
| 6,922,628 B1 | * | 7/2005 | Zhu et al. | 701/111 |
| 2005/0114012 A1 | * | 5/2005 | Zhu et al. | 701/114 |

\* cited by examiner

*Primary Examiner*—Eric S. McCall
(74) *Attorney, Agent, or Firm*—Morgan Lewis & Bockius LLP

(57) ABSTRACT

A method and system for determining a combustion misfire in an internal combustion engine by calculating a segment time; normalizing the calculated segment time; modifying the normalized segment time using low pass filters for each cylinder; calculating a misfire determination reference value by adding a minimum value among the modified normalized segment times to a predetermined offset value; and determining whether a combustion misfire occurs based on a comparison of the modified normalized segment time and the misfire determination reference value.

9 Claims, 3 Drawing Sheets

METHOD AND SYSTEM FOR DETERMINING COMBUSTION MISFIRE OF AN INTERNAL COMBUSTION ENGINE

CROSS REFERENCE TO RELATED APPLICATION

This application claims priority to Korean Application No. 10-2004-0050094, filed on Jun. 30, 2004, the disclosure of which is incorporated herein by reference.

FIELD OF THE INVENTION

Generally, the present invention relates to a method for determining combustion misfire of an internal combustion engine.

BACKGROUND OF THE INVENTION

Combustion misfires of internal combustion engines may result in increases of toxic substances in exhaust gasses that may cause air pollution and deterioration in engine performance. It is therefore necessary to determine whether a combustion misfire occurs and to take suitable action for the combustion misfire as the engine continues to operate. A conventional method exists for determining a combustion misfire based on engine rpm change. For example, U.S. Pat. Nos. 5,875,411 and 5,861,553 disclose methods for determining a combustion misfire on the basis of an engine rough-running value.

However, the conventional method involves calculation of an engine rough-running value through digital filtering of a segment time, so the calculation process and the calculation load increase substantially.

SUMMARY OF THE INVENTION

The present invention provides a method and a system for determining whether a combustion misfire occurs in an internal combustion engine through a simple calculation. The method includes: calculating a segment time; normalizing the calculated segment time; modifying the normalized segment time using low pass filters for each cylinder; calculating a misfire determination reference value by adding a minimum value among the modified normalized segment times to a predetermined offset value; and determining whether a combustion misfire occurs by comparing the modified normalized segment time and the misfire determination reference value. The calculated segment time may be normalized on the basis of the difference between segment times of a reference cylinder and an n-th cylinder, and the difference between segment times of the reference cylinder in a previous stroke and a current stroke.

The normalized segment time TS_C(n) may be calculated as a value according to the following equation:

$$TS\_C(n) = TS(n) * [1 + LPF(X(n)(i))]$$

$$X(n) = \left[TS(0) - TS(n) + \frac{n}{4} * (TS(0)' - TS(0))\right] / TS(n)$$

where TS is a segment time, i is a stroke number, n is a number of cylinders, TS(0) is a segment time of a reference cylinder in a current stroke, TS(0)' is a segment time of a reference cylinder in a previous stroke, TS(n) is a segment time of an n-th cylinder of a current stroke, X(n)(i) is a normalized value of the segment time TS, and LPF is a low pass filter function.

A combustion misfire is determined to have occurred if the modified normalized segment time is greater than the misfire determination reference value.

The system includes a crank angle sensor and a control unit, wherein the control unit determines whether a combustion misfire occurs based upon signals of the crank angle sensor, and may be programmed to perform instructions for each step of the above-stated method.

BRIEF DESCRIPTION OF THE DRAWINGS

The accompanying drawings illustrate embodiments of the present invention, and, together with the description, serve to explain the principles of the present invention, wherein.

DETAILED DESCRIPTION OF THE EMBODIMENTS

Figure 1:
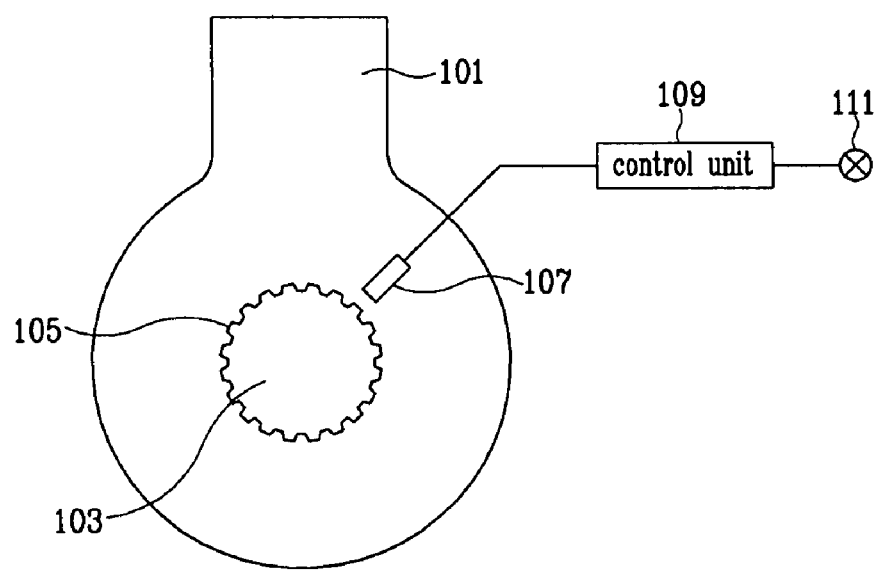
FIG. 1 is a block diagram of a system for determining whether combustion misfire occurred in an internal combustion engine according to an embodiment of the present invention.

As shown in FIG. 1, a crank angle transducer wheel 103 is provided in an internal combustion engine ("engine") 101 and a plurality of markings 105 are formed on the crank angle transducer wheel 103. Crank angle sensor 107 is disposed near crank angle transducer wheel 103 and converts the rotational movement of crank angle transducer wheel 103 to electrical signals. Control unit 109 is configured to perform combustion misfire determination based on signals received from crank angle sensor 107. Control unit 109 can be one or more processors activated by a predetermined program, and the predetermined program can be programmed to perform each step of a method according to an embodiment of this invention. If control unit 109 determines that a combustion misfire has occurred, control unit 109 switches on warning lamp 111.

Figure 2:
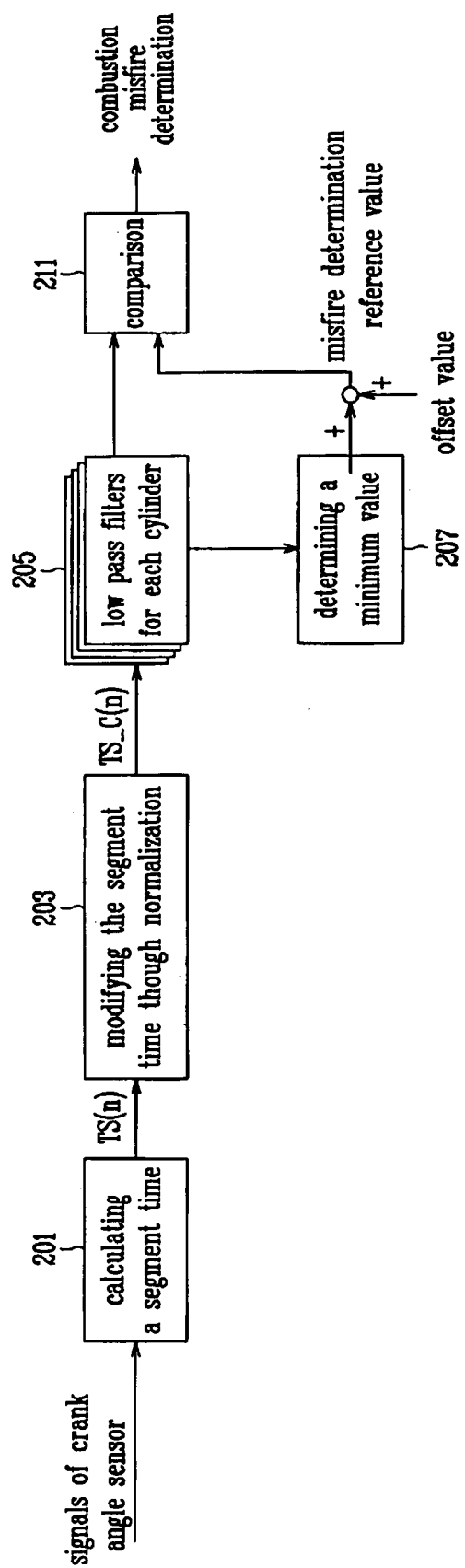
FIG. 2 is a block diagram of modules employed in determining whether a combustion misfire occurred in an internal combustion engine according to an embodiment of the present invention.
Figure 3:
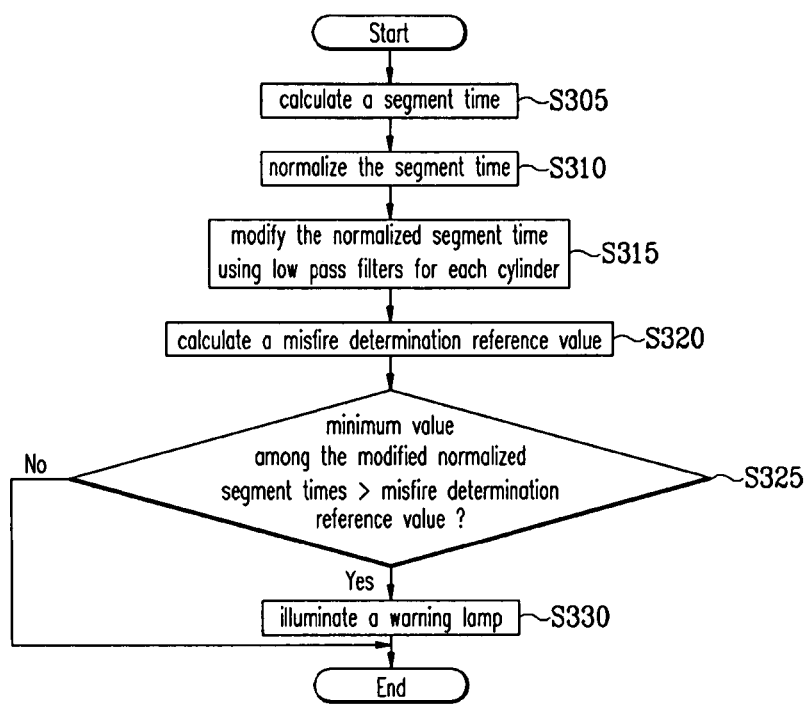
FIG. 3 is a flowchart showing a method for determining whether a combustion misfire occurred in an internal combustion engine according to an embodiment of the present invention.

FIG. 2 is a block diagram of modules in control unit 109 that determine whether a combustion misfire occurred in an internal combustion engine. FIG. 3 describes a method for determining whether a combustion misfire occurred in an internal combustion engine. At step S305, segment time calculating module 201 of control unit 109 calculates a segment time TS(n) based upon signals received from crank angle sensor 107. As calculation of the segment time is obvious in the art, detailed explanation will be omitted. At step S310, segment normalization module 203 of control unit 109 normalizes the calculated segment time. A normalized segment time TS(n) is calculated by the normalization of the segment time, and the normalized segment time can be referred to as a segment time moving average.

For example, the normalized segment time TS_C(n) can be determined according to the following Equation 1:

$$TS\_C(n) = TS(n) * [1 + LPF(X(n)(i))] \quad (1)$$

$$X(n) = \left[TS(0) - TS(n) + \frac{n}{4} * (TS(0)' - TS(0))\right] / TS(n),$$

where TS is a segment time, i is a stroke number, n is a number of cylinders (e.g., 0, 1, 2, or 3, in the case of a 4-cylinder engine), TS(0) is a segment time of a reference cylinder in a current stroke (i.e., (i)-th stroke), TS(0)' is a segment time of a reference cylinder in a previous stroke (i.e., (i-1)-th stroke), TS(n) is a segment time of an n-th cylinder of a current stroke (i.e., (i)-th stroke), X(n)(i) is a normalized value of the segment time, and LPF is a low pass filter function.

The normalized segment time, in which changes in the segment time are caused by engine vibration, is modified because the normalized value of the segment time is calculated on the basis of the difference between the segment times of the reference cylinder and the n-th cylinder, and between the segment times of the reference cylinder in the previous and current strokes. The LPF is a low pass filter having a relevant time constant to prevent sudden changes of the normalized value of the segment time. The time constant of the low pass filter can be determined on the basis of various parameters, such as an engine vibration characteristic that may affect the segment time while an engine is operating normally. At step S315, each cylinder's low pass filter 205 in control unit 109 modifies the normalized segment time.

Control unit 109 then calculates, at step S320, a misfire determination reference value by adding a minimum value among the modified normalized segment times to a predetermined offset value. The predetermined offset value may be determined on the basis of an engine rpm, an engine load, and the like. For example, the predetermined offset value may be determined from a lookup table having offset values defined with respect to an engine rpm and an engine load. As shown in FIG. 2, minimum value determination module 207 determines the minimum value among the modified normalized segment times that are obtained using the low pass filters for each cylinder. The determined minimum value and the predetermined offset value are added together and the misfire determination reference value is thereby obtained. Time constants of each cylinder's low pass filter 205 may be determined on the basis of engine vibration characteristics in the normal operation of an engine and in a misfire of an engine, such that noises of the normalized segment time can be cancelled.

Subsequently, at step S325, comparison unit 211 of control unit 109 determines whether the normalized segment times modified by each cylinder's low pass filter 205 are greater than the misfire determination reference value. If the modified normalized segment time is greater than the misfire determination value, then a misfire is determined to have occurred. In such a case, control unit 109 illuminates warning lamp 111 at step S330. On the other hand, if the modified normalized segment time is not greater than the misfire determination value, then no misfire is determined to have occurred.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

According to an embodiment of the present invention, because a misfire determination is performed without calculating an engine rough-running value, the calculation load for misfire determination decreases substantially. Accordingly, a credible misfire determination can be obtained under a small calculation load.

What is claimed is:

1. A method for determining a combustion misfire of an internal combustion engine having at least one cylinder, comprising the steps of:
    calculating a segment time;
    normalizing the calculated segment time;
    modifying the normalized segment time using low pass filters for each at least one cylinder;
    calculating a misfire determination reference value by adding a minimum value among the modified normalized segment times to a predetermined offset value; and
    determining whether a combustion misfire occurs based upon a comparison of the modified normalized segment time and the misfire determination reference value.

2. The method of claim 1, wherein, in the normalizing step, the calculated segment time is normalized based upon a difference between segment times of a reference cylinder and an n-th cylinder, and a difference between segment times of the reference cylinder in a previous stroke and a current stroke.

3. The method of claim 2, wherein the normalized segment time TS_C(n) is calculated as a value according to the following equation:

$$TS\_C(n) = TS(n) * [1 + LPF(X(n)(i))]$$

$$X(n) = \left[TS(0) - TS(n) + \frac{n}{4} * (TS(0)' - TS(0))\right] / TS(n)$$

where TS is a segment time, i is a stroke number, n is a number of cylinders, TS(0) is a segment time of a reference cylinder in a current stroke, TS(0)' is a segment time of a reference cylinder in a previous stroke, TS(n) is a segment time of an n-th cylinder of a current stroke, X(n)(i) is a normalized value of the segment time, and an LPF is a low pass filter function.

4. The method of claim 1, wherein, in the determining step, it is determined that a combustion misfire occurs if the modified normalized segment time is greater than the misfire determination reference value.

5. The method of claim 1, further comprising:
    illuminating a warning lamp if if a combustion misfire is determined to have occurred.

6. A system for determining a combustion misfire of an internal combustion engine, comprising:
    a crank angle sensor; and
    a control unit for determining whether a combustion misfire occurs on the basis of signals of the crank angle sensor, wherein the control unit is programmed to perform instructions comprising:
    calculating a segment time;
    normalizing the calculated segment time;
    modifying the normalized segment time using low pass filters for each at least one cylinder;
    calculating a misfire determination reference value by adding a minimum value among the modified normalized segment times to a predetermined offset value; and determining whether a combustion misfire occurs based upon a comparison of the modified normalized segment time and the misfire determination reference value.

7. The system of claim 6, wherein in the normalizing step, the calculated segment time is normalized based upon a difference between segment times of a reference cylinder and an n-th cylinder, and a difference between segment times of the reference cylinder in a previous stroke and a current stroke.

8. The system of claim 7, wherein the normalized segment time TS_C(n) is calculated as a value according to the following equation:

$$TS\_C(n) = TS(n) * [1 + LPF(X(n)(i))]$$

$$X(n) = \left[ TS(0) - TS(n) + \frac{n}{4} * (TS(0)' - TS(0)) \right] / TS(n)$$

where TS is a segment time, i is a stroke number, n is a number of cylinders, TS(0) is a segment time of a reference cylinder in a current stroke, TS(0)' is a segment time of a reference cylinder in a previous stroke, TS(n) is a segment time of an n-th cylinder of a current stroke, X(n)(i) is a normalized value of the segment time, and an LPF is a low pass filter function.

9. The system of claim 6, wherein, in the determining step, it is determined that a combustion misfire occurs if the modified normalized segment time is greater than the misfire determination reference value.

\* \* \* \* \*